(No Model.)
H. A. FRASCH.
PROCESS OF MAKING CONCENTRATED NITRIC ACID.
No. 517,098. Patented Mar. 27, 1894.
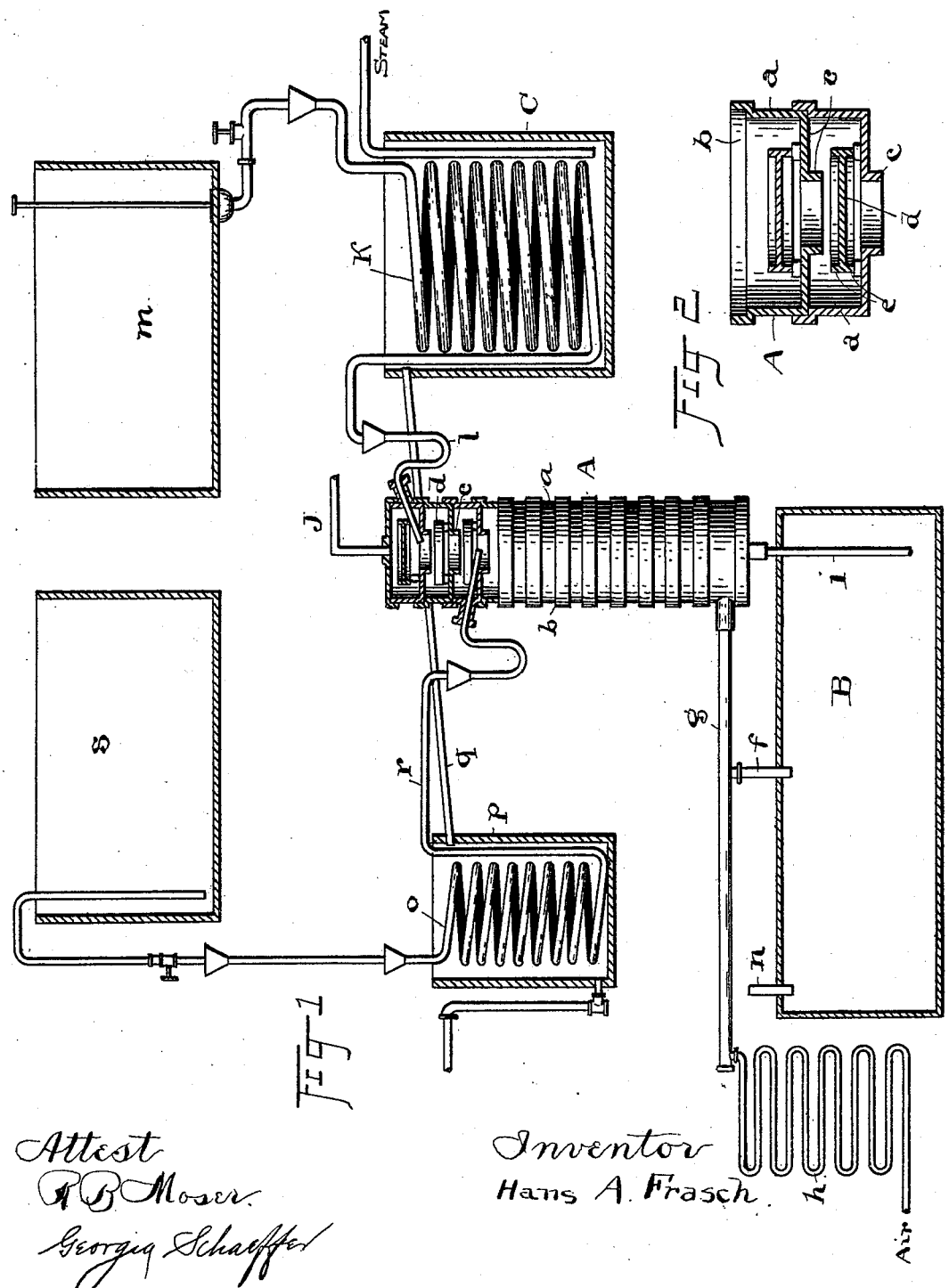
Attest
R. B. Moser.
Georgia Schaeffer
Inventor
Hans A. Frasch.
By H. J. Fisher Attorney

UNITED STATES PATENT OFFICE.

HANS A. FRASCH, OF CLEVELAND, OHIO, ASSIGNOR TO THE GRASSELLI CHEMICAL COMPANY, OF SAME PLACE.

PROCESS OF MAKING CONCENTRATED NITRIC ACID.

SPECIFICATION forming part of Letters Patent No. 517,098, dated March 27, 1894.

Application filed April 21, 1893. Serial No. 471,359. (No specimens.)

*To all whom it may concern:*

Be it known that I, HANS A. FRASCH, a citizen of the United States, residing at Cleveland, in the county of Cuyahoga and State of Ohio, have invented certain new and useful Improvements in the Manufacture of Nitric Acid; and I do hereby declare that the following is a full, clear, and exact description of the invention, which will enable others skilled in the art to which it appertains to make and use the same.

In the manufacture of nitric acid, sodium nitrate is subjected to the action of sulfuric acid, the resulting vapors of nitric acid being condensed by divers means. The vapors of nitric acid resulting from this process, while yielding full strength acid during the first part of the reaction, become more and more charged with aqueous vapors as the process proceeds, and as a result the nitric acid obtained becomes of less strength.

The object of my invention is to avoid the formation of this weak acid, or to convert it to full strength acid.

To carry out my invention, I conduct the vapor coming from a nitric acid still to a column in which such vapor meets or is brought into contact with sulfuric acid or any other absorbing material whose boiling point is above that of nitric acid, and which is not reacted upon by nitric acid.

I may remark that I am aware that weak nitric acid has been concentrated by mixing it with sulfuric acid and then distilling it, but this results in obtaining only a comparitively small proportion of full strength nitric acid, unless an abnormally large quantity of sulfuric acid is employed. To avoid this difficulty, and also to render it possible to obtain full strength nitric acid from the first operation of manufacturing nitric acid and to save a troublesome second distillation, without excessive addition of sulfuric acid, I subject the vapors coming from the still or converter, before condensation, to the exsiccating action of sulfuric acid or some other siccative as, for example, anhydrous sulfate of soda, which is indifferent to the action of nitric acid.

The invention will be described in detail first and then particularly pointed out and claimed.

In the accompanying drawings illustrating my invention, in both figures of which like parts are similarly designated, Figure 1 is a sectional diagrammatical elevation of the nitric acid plant arranged in accordance with my invention; and Fig. 2 is a sectional elevation, on a larger scale, of the still column.

The letter A designates the still column. In the preferred form, this still column consists of a number of sections $a$. Each of these sections is provided with an open mouth $b$, adapted to receive the bottom of the section next above, and having a substantially central opening $c$, surrounded by a depending flange. Beneath the flanged opening of each section is arranged a dish or plate $d$, having a peripheral flange $e$ projecting from both sides of the same, and these dishes or plates are supported upon the next lower section by means of blocks or supports of suitable character. These dishes or plates contain within their peripheral flanges a quantity of the siccative. This still column is connected with a converter B, of any suitable or usual construction, by means of a pipe $f$, which opens into a main $g$, the latter being connected with the bottom of the still column at one end, and at the other end connected with a hot air coil $h$ for a purpose presently appearing. The pipe $i$ is a liquid locking or sealing device connecting the still column A with the converter. The nitric acid vapor exit pipe $j$ is applied at the top of the still column.

C is a tank in which is arranged a coil of pipe $k$, to which sulfuric acid is supplied, and in which it is heated; for example, by a steam-heated water bath within the tank C. The coil $k$ has an outlet into a trap $l$, which opens into the top of the still column A. Sulfuric acid may be supplied to the coil $k$ from a tank $m$, or in any other convenient way.

The parts of my apparatus will be made of appropriate material to resist the action of the acids; for example, the part B may be of iron, glass or other substance; the part P of earthenware, porcelain, glass, enameled iron, &c., or aluminum may be employed; and the pipes may be of lead, but I do not limit my invention to the material or substance of which the apparatus is constructed.

The operation of the device so far described is as follows: The converter B is charged with sodium nitrate and the requisite amount of sulfuric acid is added, as, for example, through the pipe n. The nitric acid vapors produced by the first reaction leave the converter through pipe f, and, ascending column A, together with the hot air, coming from the hot air coil h, pass thence to the condensers through pipe j. When weak vapors begin to show, heat is applied to the converter B, while, at the same time, the sulfuric acid coil k is heated, and sulfuric acid admitted to the still column through said coil. The quantity of sulfuric acid admitted is regulated in accordance with the strength of the vapor leaving the still column. It will be observed that the sulfuric acid falls upon the series of plates d, and is distributed over them, overflowing from the upper plates to the lower, and thus being diffused over a considerable area. The hot air is admitted to convey heat to the still column and prevent unnecessary condensation, as also to oxidize possible lower oxides in the nitric acid. It thus serves to hasten distillation and to carry off the vapors. Circulation is insured and regulated by means of a steam or other injector at the outlet end of the plant.

The apparatus can also be used for the concentration of weak nitric acid, in which case I add to the apparatus already described a coil o, which is arranged in a tank p, which may be heated by steam or by the hot water overflowing through pipe q from the tank C. This coil o is connected with the still column through the pipe r, and the weak nitric acid is supplied to the coil through the tank s, or in any other way. The weak nitric acid is admitted into the still column at a point several sections below the section through which the sulfuric acid is admitted, so that the nitric acid vapors shall be exposed to the action of a number of plates full of sulfuric acid before escaping from the still. In this way I may utilize the large quantities of weak nitric acid heretofore produced in the manufacture of nitric acid.

What I claim is—

1. The process of manufacturing concentrated nitric acid, which consists in exposing nitric acid vapors to the action of sulfuric acid at a temperature above the condensation point of the nitric acid desired to be obtained, substantially as described.

2. In the art of making nitric acid, the improvement which consists in subjecting nitric acid vapors to the action of a dehydrating agent which is not affected by nitric acid and the strength of which is maintained proximately uniform, substantially as described.

3. The process of manufacturing concentrated nitric acid, which consists in exposing nitric acid vapors to the action of sulfuric acid and hot air, substantially as described.

Witness my hand to the foregoing specification.

HANS A. FRASCH.

Witnesses:
H. T. FISHER,
GEORGIA SCHAEFFER.